Patented June 2, 1953

2,640,815

UNITED STATES PATENT OFFICE 2,640,815

RESINOUS PRODUCTS FROM DIHYDROPYRAN DERIVATIVES AND METHOD FOR PRODUCING THE SAME

Richard R. Whetstone, Berkeley, and Seaver A. Ballard, Orinda, Calif., assignors to Shell Development Company, San Francisco, Calif., a corporation of Delaware No Drawing. Application September 11, 1948, Serial No. 48,922

16 Claims. (Cl. 260—23)

This invention relates to synthetic resinous products. More particularly the invention relates to a new class of resinous products prepared from dihydropyran derivatives, and to a method for producing the same.

More specifically the invention provides a new and particularly useful class of resinous products which are prepared by reacting certain dihydropyran carboxaldehydes described hereinafter with certain polyhydroxy-substituted compounds and partial derivatives thereof described hereinafter in the presence of an acid or an acid-acting catalyst. The resinous products produced by this method possess many beneficial unexpected properties which could not have been foreseen from anything disclosed in the art and as a result can be utilized as such or in a cured state for many important industrial applications described hereinafter.

It is an object of the invention to provide a new and particularly useful class of resinous products from dihydropyran carboxaldehydes. It is a further object of the invention to provide a novel class of resinous products from dihydropyran carboxaldehydes possessing many unexpected properties which enable the said products to be utilized for many commercial purposes. It is a further object to provide resinous products from dihydropyran carboxaldehydes which may be utilized in the manufacture of adhesive fabrics, glues, and the like. It is a further object to provide resinous products from dihydropyran carboxaldehydes which may be used in the preparation of modified drying oils, surface coatings and the like. It is a further object of the invention to provide resinous products from dihydropyran carboxaldehydes which may be cured to form hard surfaced resins possessing many improved properties. It is a further object to provide resinous products from the dihydropyran carboxaldehydes which may be prepared by a very simple and economical process. It is a further object to provide a method for the production of resinous products from dihydropyran derivatives. Other objects of the invention will be apparent from the detailed description given hereinafter.

It has now been discovered that these and other objects of the invention may be accomplished by novel resinous products of the dihydropyran carboxaldehydes which are prepared by reacting in the presence of an acid or acid-acting catalyst a dihydropyran carboxaldehyde described hereinafter with a member of the following group of polyhydroxy-substituted compounds or partial derivatives thereof: polyhydric aliphatic alcohols, polyhydric aromatic alcohols, polyhydric aliphatic alcohol partial esters, polyhydric aromatic alcohol partial esters, polyhydric aliphatic alcohol partial ethers, polyhydric aromatic alcohol partial ethers, polyhydric aliphatic alcohol partial ether-esters, and polyhydric aromatic alcohol partial ether-esters. For brevity, these polyhydroxy-substituted compounds and partial derivatives thereof will be referred to herein as "hydroxy-substituted compounds." The resinous products produced by this method vary in form from viscous liquids to semi-solids and possess many unexpected properties which make the said products real material for use in many commercial applications. The novel resinous products, for example, possess adhesive properties and are thus able to be used in the preparation of adhesive fabrics, glues, and the like. In addition, the products obtained by reacting the dihydropyran carboxaldehydes with certain glycerol derivatives described below show excellent air drying properties and form, after air drying and baking, films having superior resistance to solvents, and the like. It has been further discovered that the above-described resinous products may be subjected to a subsequent curing process to produce hard surfaced resins possessing excellent strength and clear, attractive surfaces which do not discolor after extended periods of exposure to sunlight, said resins being suitable material for the production of many articles, such as buttons, combs, surface coverings, etc. which are in constant demand in industry.

A particular advantage of the resinous products of the invention is the fact that they may be produced in a very easy and economical manner. The reaction between the dihydropyran carboxaldehydes and the hydroxy-containing compounds proceeds smoothly without the addition of any catalytic material other than inexpensive acids and without the maintenance of any critical reaction temperatures or pressures. Unlike many other resin-forming reactions there is very little if any water formed during the reaction of the dihydropyran carboxaldehydes and the hydroxy-containing compounds or during the curing of the resulting reaction product. This is of a particular advantage as it eliminates the necessity of employing expensive and cumbersome means of removing the water, and in addition enables the production of resinous products of better quality.

The dihydropyran carboxaldehydes which are utilized in the production of the novel resinous products of the invention are those dihydropyran compounds wherein the double bond in the pyran ring is attached to a ring carbon atom adjacent to the ring oxygen atom and at least one of the hydrogen atoms attached to the ring carbon atoms has been replaced by a formyl radical, i. e. a

radical. The other hydrogen atoms attached to the carbon atoms of the pyran ring may be replaced if desired with non-interfering substituents, such as hydrocarbon radicals, carboxy radicals, halogen atoms, and the like.

A preferred group of the dihydropyran carboxaldehydes to be used in producing the novel resinous products of the invention are those of the general formula:

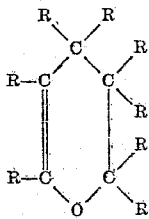

wherein at least one R is a formyl radical and the remaining R's are members of the group consisting of a hydrogen atom, a halogen atom, and open-chain hydrocarbon radicals, preferably containing from 1 to 5 carbon atoms.

The halogen atoms which R may represent in the above-described general formula may be chlorine, bromine, iodine and fluorine. The short-chain hydrocarbon radicals which R may represent may be exemplified by methyl, ethyl, propyl, isopropyl, butyl, isobutyl, pentyl, isopentyl, ethenyl, butenyl, isobutenyl, pentenyl and the like radicals.

Examples of the preferred dihydropyran carboxaldehyde which may be used in producing the novel resinous products of the invention are:

2,5 - dichloro - 3,4 - dihydro - 1,2 - pyran - 2-carboxaldehyde
2 - methyl - 3,4 - dihydro - 1,2 - pyran - 3 - carboxaldehyde
2,5 - dimethyl - 3,4 - dihydro - 1,2 - pyran - 4-carboxaldehyde
3,4-dihydro-1,2-pyran-2-carboxaldehyde
2,5 - dimethyl - 3,4 - dihydro - 1,2 - pyran - 3-carboxaldehyde
2 - butyl - 3,4 - dihydro - 1,2 - pyran - 4 - carboxaldehyde
4 - methyl - 3,4 - dihydro - 1,2 - pyran - 5 - carboxaldehyde
2 - butyl - 3,4 - dihydro - 1,2 - pyran - 6 - carboxaldehyde
2,5 - diisopropyl - 3,4 - dihydro - 1,2 - pyran-2-carboxaldehyde
3,5 - dibromo - 3,4 - dihydro - 1,2 - pyran - 3-carboxaldehyde
4 - butenyl - 3,4 - dihydro - 1,2 - pyran - 2 - carboxaldehyde A particularly preferred group of the dihydropyran carboxaldehydes to be used in producing the novel resinous products are those of the general formula:

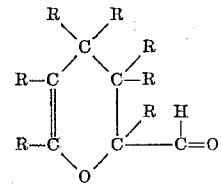

wherein R is a member of the group consisting of hydrogen atoms and alkyl radicals containing from 1 to 5 carbon atoms.

Examples of this particularly preferred group of dihydropyran carboxaldehydes are:

3,4-dihydro-1,2-pyran-2-carboxaldehyde
2,5 - dimethyl - 3,4 - dihydro - 1,2 - pyran - 2-carboxaldehyde
5-butyl-3,4-dihydro-1,2-pyran-2-carboxaldehyde
3,4 - diethyl - 3,4 - dihydro - 1,2 - pyran - 2-carboxaldehyde
2,3,5 - triethyl - 3,4 - dihydro - 1,2 - pyran - 2-carboxaldehyde
2,4,6 - trimethyl - 3,4 - dihydro - 1,2 - pyran - 2-carboxaldehyde The above-described dihydropyran carboxaldehydes may be produced by any suitable method. The more preferred method comprises condensing an unsaturated aldehyde containing the appropriate number of carbon atoms in the presence of a suitable polymerization inhibitor at an elevated temperature. Thus, for example, 2,5-dimethyl - 3,4 - dihydro - 1,2 - pyran - 2 - carboxaldehyde may be prepared by condensing methacrolein in the presence of hydroquinone at a temperature of about 170° C. In like manner, 2,5 - dichloro-3,4-dihydro-1,2-pyran - 2 - carboxaldehyde may be prepared from alpha-chloroacrolein; 2-methyl-3,4-dihydro-1,2-pyran-2-carboxaldehyde from acrolein and methacrolein; and 3,4 - dihydro - 1,2 - pyran - 2 - carboxaldehyde from acrolein. A more detailed description of the method for producing the described dihydropyran carboxaldehydes may be found in co-pending applications Serial No. 713,455, filed December 2, 1946, now Patent 2,479,283 issued August 16, 1949 and Serial No. 735,029, filed March 15, 1947, now Patent 2,479,284 issued August 16, 1949.

The novel resinous products of the invention are obtained by reacting the above-described dihydropyran carboxaldehydes with a member of the following group of polyhydroxy-substituted compounds or partial derivatives thereof: polyhydric aliphatic alcohols, polyhydric aromatic alcohols, polyhydric aliphatic alcohol partial esters, polyhydric aromatic alcohol partial esters, polyhydric aliphatic alcohol partial ethers, polyhydric aromatic alcohol partial ethers, polyhydric aliphatic alcohol partial ether-esters, and polyhydric aromatic alcohol partial ether-esters.

The polyhydric aliphatic alcohols may be exemplified by glycol, glycerol, 2,4-butanediol, 2,4,6-heptanetriol, 2,4-hexadienediol-1,6,polyvinyl alcohol, polyallyl alcohol, 1,5-cyclopentanediol, 1,2,5-cyclohexanetriol, and the like. The polyhydric aromatic alcohols may be exemplified by pyrocatechol, resorcinol, phloroglucinol, 1,3- napthalenediol, 1,4,5,8-napthalenetetrol, and the like.

The polyhydric aliphatic alcohol partial esters may be exemplified by glycol monobutyrate, glycerol monostearate, glycerol monohexanoate, glycerol monophthalate, 2,4-butanediol monostearate, 1,5-cyclopentanediol monopalmitate, 1,2,5-cyclohexanetriol diacetate, glycerol monolaurate, glycerol monoacetate, 2,4,6 - heptanetriol dioctanoate, and the like. The polyhydric aromatic alcohol partial esters may be exemplified by resorcinol monoacetate, phloroglucinol monooleate, pyrogallol dihexanoate, 1,3-naphthalenediol monooctanoate, 1,4-naphthalenediol monocaproate, and the like.

The polyhydric aliphatic alcohol partial ethers may be exemplified by glycol monopentyl ether, glycerol monoethyl ether, glycerol monophenyl ether, glycerol monooctyl ether, 2,4-butanediol monobutyl ether, 1,5-cyclopentanediol monodecyl ether, 1,2 - cyclohexanetriol monoallyl ether, 2,4,6 - heptanetriol diethallyl ether, glycerol monobutyl ether and the like. The polyhydric aromatic alcohol partial ethers may be exemplified by resorcinol monophenyl ether, phloroglucinol monohexyl ether, pyrogallol monoallyl ether, 1,4,5-naphthalenetriol monobutyl ether, 1,3-naphthalenetriol monobutadienyl ether, 1,4,5-naphthalenetriol dibutyl ether, 1,4-naphthalenediol monomethyl ether, and the like.

The polyhydric aliphatic alcohol partial ether esters may be exemplified by glycerol monobutyl ether monostearate, glycerol monohexyl ether monocaproate, hexanetriol monooctyl ether monoacetate, octanetriol monomethyl ether monopalmitate, cyclohexanetriol monodecyl ether monoacetate, and the like. The polyhydric aromatic alcohol partial ether esters may be exemplified by phloroglucinol monohexyl ether monostearate, pyrogallol monoallyl ether monoacetate, 1,4,5-naphthalenetriol monooctyl ether monobutyrate, and the like.

Particularly preferred hydroxy - containing compounds to be used in the process of the invention are the organic hydroxy-containing compounds of the group consisting of the polyhydric saturated aliphatic alcohols containing from 1 to 10 carbon atoms, the polyhydric, mononuclear aromatic alcohols containing from 6 to 10 carbon atoms, the polyhydric alcohol partial esters of the polyhydric saturated aliphatic alcohols containing from 2 to 10 carbon atoms and open-chain monocarboxylic acids containing from 1 to 18 carbon atoms, the polyhydric alcohol partial esters of the polyhydric, mononuclear aromatic alcohols containing from 6 to 10 carbon atoms and open-chain monocarboxylic acids containing from 1 to 18 carbon atoms, the polyhydric alcohol partial ethers of the polyhydric saturated aliphatic alcohols containing from 2 to 10 carbon atoms and monohydric saturated alcohols containing from 1 to 10 carbon atoms, and the polyhydric alcohol partial ethers of the polyhydric, mononuclear aromatic alcohols containing from 6 to 10 carbon atoms and monohydric saturated alcohols containing from 1 to 10 carbon atoms.

Examples of this particularly preferred group of hydroxy-containing compounds to be used in the process of the invention are glycerol, 2,4-butanediol, resorcinol, phloroglucinol, octanetriol, decanetriol, glycerol stearate, glycerol monocaproate, hexanetriol monolaurate, heptanetriol monovalerate, glycerol dipentadecanoate, glycerol monobutyl ether, glycerol monooctyl ether, hexanetriol monodecyl ether, resorcinol monostearate, phloroglucinol monolaurate, naphthalenetriol dicaproate, phloroglucinol monodecyl ether, and the like.

An important species of the above-described hydroxy-containing compounds, especially when they are to be used in the production of resinous products to be used in the preparation of drying oils, are the glycerol mono- or diglycerides of drying oil acids. Examples of such glycerides are glycerol dioleate, glycerol linolenate, glycerol oleate linolenate, glycerol senecioate, glycerol dilinolenate, glycerol disorbate, glycerol dioctenoate, glycerol 2,8-decadienoate, glycerol 5,8-eicasodienate, and glycerol pentacosadienoate.

The above-described mono- and diglycerides of glycerol may be prepared by esterifying the glycerol molecule with the appropriate quantities of the desired drying oil acids, preferably the open-chain, aliphatic acids containing from 6 to 30 carbon atoms, such as senecioic acid, sorbic acid, linoleic acid, linolenic acid, oleic acid, and the like acids. The glycerides may also be prepared by reacting glycerol with the drying oils themselves.

In producing the novel resinous products from the above-described compounds a single dihydropyran carboxaldehyde may be reacted with a single polyhydroxy-substituted compound or derivative thereof described hereinabove, or a mixture of two or more of the two types of ingredients may be reacted together. Thus, for example, a mixture of 3,4-dihydro-1,2-pyran-2-carboxaldehyde and 2,5-diethyl-3,4-dihydro-1,2-pyran-2-carboxaldehyde may be reacted with glycerol distearate, or 3,4-dihydroxy-1,2-pyran-2-carboxaldehyde may be reacted with a mixture of polyhydroxy-substituted compounds or derivatives thereof as disclosed in Examples II, VIII, XII and XV at the end of the specification.

The quantity of the reactants to be added to the reaction mixture will vary over a considerable range depending upon the number of free-hydroxyl groups present in the hydroxy-containing compound and upon the particular type of product desired. In general the reactants may be added so that the equivalent ratio of the dihydropyran carboxaldehyde and hydroxy-containing compounds will vary from 5:1 to 1:5. An equivalent amount of the hydroxy-containing compound refers to that amount sufficient to furnish one hydroxyl group for every carboxaldehyde group present in the dihydropyran carboxaldehyde molecule. Preferably the reactants are added to the reaction mixture so that the equivalent ratio of dihydropyran carboxaldehyde and hydroxy-containing compound will vary between 1:2 and 2:1. In case the final product desired is a hard surfaced resin it is usually preferred to utilize smaller quantities of the hydroxy-containing compound, e. g. the equivalent ratio of the dihydropyran carboxaldehyde to the hydroxy-containing compound may vary from 1:1 to 2:1. The exact amount to be used in any case may best be determined, however, for each individual case.

Any acid catalyst or acid-acting catalyst may be utilized in the process of the invention. The acids may be organic or inorganic and may be monobasic or polybasic acids. Examples of the inorganic acids that may be utilized as catalysts are boric acid, sulfuric acid, hydrochloric acid, phosphoric acid, and the like. Examples of the organic acids that may be used in the reaction are acetic acid, butyric acid, p-toluenesulfonic acid, benzoic acid, oxalic acid, malonic acid, succinic acid, pimelic acid. Preferred acids to be used are the moderately strong acids, such as p-toluenesulfonic acid and oxalic acid.

The reaction may be executed in the presence or absence of solvents or diluents. In case the solvents or diluents are desired, inert chemical compounds, such as benzene, toluene, xylene, cyclohexane, ethyl ether, and the like may readily be employed.

The temperature employed during the reaction may vary over a considerable range, depending upon the type and proportion of reactants, catalyst employed, etc. In some cases the reaction will be exothermic and it will be desirable to employ some cooling means to maintain the reaction mixture at a lower temperature. The temperatures may generally vary between 0° C. to 250° C., with a preferred range being between 20° C. to 100° C. Atmospheric, subatmospheric or superatmospheric pressures may be used.

The resinous products formed by the above-described reaction may be separated from the reaction mixture by any suitable means comprising solvent extraction, filtration, distillation, and the like.

The resinous products obtained from the reaction will vary from viscous liquids to semisolids depending upon the type and proportion of reactants employed. The said products are substantially colorless and possess adhesive properties which enable them to adhere to surfaces of wood, metal, glass, and the like. They are thus ideal material to be used in the preparation of adhesive fabrics, glues, surface coatings, laminating compositions, etc.

If the resinous products are to be utilized in their cured state they may be subjected to a final curing process while they are in the reaction mixture or the products may be separated from the mixture by the above-described methods and subsequently subjected to the curing process. The curing of the resinous material may be accomplished by the application of heat and/or light in the presence or absence of catalysts. Temperatures employed during the curing may vary from 50° C. to 200° C., or higher, with preferred temperatures ranging from 60° C. to 100° C.

In those cases where the process is to be conducted in a one stage operation, i. e. when the resinous products are cured in the reaction mixture in which they are formed, the acid or acid acting catalyst present in the reaction mixture may act as a catalyst for the curing process. Other catalysts that may be employed to hasten the curing of the resinous products include sulfuric acid, benzoyl peroxide, acetyl peroxide, sodium peroxide, barium peroxide, peracetic acid, perphthalic acid, and the like. Amount of the catalyst employed will usually vary between 0.01% to 5% by weight of the material being cured, however, larger or smaller amounts may be utilized if desired.

The curing process may be carried to completion without substantial interruption or it may be stopped at any point short of completion. Incomplete curing may be used for producing products which may be further worked and eventually completely polymerized. The product may, for example, be transferred to a mold of any desired configuration and again subjected to the curing process.

The hard surfaced resins obtained from this curing process may be milled, drilled, cut and machined to produce many desired products of commerce, such as buttons, pins, handles, table coverings, etc. They may also be powdered to produce molding compositions or may be dissolved in solvents to be used in the preparation of surface coatings, impregnating agents, multilayer laminates, and the like. The solvent or molten resins may also be cast into sheets, rods, tubes, thin films, filaments, fibers, etc.

The resinous products of the invention may be modified in any of a variety of ways by the use of large numbers of modifying substances. Some of these substances may be added to the mixture of the dihydropyran carboxaldehyde and hydroxy-containing compound prior to or during the resin-forming reaction, while others may be added prior to or during the final curing process. Such modifying agents include the conventional plasticizers, stabilizers, lubricants, dyes, pigments and fillers. Examples of such agents are asbestos, sand, clay, talc, mica, wood flour, cotton, pitch, asphalt, shellac, copal, camphor, naphthalene, anthracene, dioctyl phthalate, dibutyl phthalate, tricresyl phosphate, and the like. An important group of modifiers consists of the organic plastic substances, such as protein plastics, phenol-aldehyde condensation products, vinyl-type addition products, such as polystyrene, polyvinyl chloride, polyvinylidene chloride, polymethyl methacrylate, polymethacrylonitrile, and the like.

To illustrate the manner in which the invention may be carried out the following examples are given. It is to be understood, however, that the examples are for the purpose of illustration only and they are not to be regarded as limiting the invention in any way.

*Example I*

About 28 parts of 3,4-dihydro-1,2-pyran-2-carboxaldehyde were mixed with 16.5 parts of resorcinol in the presence of 0.5% oxalic acid. The mixture was maintained at 65° C. and at the completion of the reaction a soft solid having excellent adhesive properties was obtained. The material readily adhered to glass, wood surfaces, and the like.

*Example II*

About 45 parts of 3,4-dihydro-1,2-pyran-2-carboxaldehyde were mixed with 12 parts of glycerol and 6 parts of resorcinol in the presence of 0.5% oxalic acid. The mixture was maintained at 65° C. and at the completion of the reaction a solid was obtained which when subjected to further heating formed a hard surfaced, substantially colorless resin.

*Example III*

(a) About 45 parts of 3,4-dihydro-1,2-pyran-2-carboxaldehyde were mixed with 36 parts of glycerol in the presence of 0.5% oxalic acid. The mixture was maintained at 65° C. and at the completion of the reaction a soft resinous solid was obtained.

(b) About 28 parts of 3,4-dihydro-1,2-pyran-2-carboxaldehyde were mixed with 9 parts of glycerol in the presence of .1 part of phosphoric acid. The mixture was maintained at 65° C. and at the completion of the reaction a soft solid was obtained which was subsequently cured to form a hard surfaced, colorless resin.

(c) About 28 parts of 3,4-dihydro-1,2-pyran-2-carboxaldehyde were mixed with 8 parts of glycerol in the presence of 1 part of tartaric acid. The mixture was heated at 65° C. and the resinous product subjected to a curing process. The final product was a hard surfaced, colorless resin.

(d) About 28 parts of 2,5-dimethyl-3,4-dihydro-1,2-pyran-2-carboxaldehyde were mixed with 6 parts of glycerol in the presence of 0.5% oxalic acid. After heating at 80° C. a viscous liquid was obtained.

*Example IV*

About 28 parts of 3,4-dihydro-1,2-pyran-2-carboxaldehyde were mixed with about 9.3 parts of ethylene glycol and 0.5% oxalic acid. The mixture was maintained at 65° C. and at the completion of the reaction a soft, resinous solid was obtained.

*Example V*

About 37 parts of 3,4-dihydro-1,2-pyran-2-carboxaldehyde were mixed with 15 parts of 1,2,6-hexanetriol in the presence of 0.5% oxalic acid. The mixture was maintained at 65° C. and at the completion of the reaction a soft, resinous solid was obtained.

*Example VI*

28 parts of 3,4-dihydro-1,2-pyran-2-carboxaldehyde were reacted with 11 parts of trimethylol propane in the presence of oxalic acid. The resulting product was a soft, resinous solid.

*Example VII*

About 56 parts of 3,4-dihydro-1,2-pyran-2-carboxaldehyde were reacted with 17 parts of pentaerythritol in the presence of oxalic acid. The resulting product was a soft, resinous solid.

*Example VIII*

About 28 parts of 3,4-dihydro-1,2-pyran-2-carboxaldehyde were reacted with 9 parts of glycerol and .5 part of polyvinyl alcohol in the presence of oxalic acid. The resulting product was cured at 65° C. to form a hard surfaced, colorless resin.

*Example IX*

12 parts of 3,4-dihydro-1,2-pyran-2-carboxaldehyde were reacted with 15 parts of glycerol n-decyl ether in the presence of oxalic acid. The resulting product was a soft, resinous solid.

*Example X*

28 parts of 3,4-dihydro-1,2-pyran-2-carboxaldehyde were mixed with 9 parts of glycerol and 1.2 parts of ethyl cellulose in the presence of 0.5% oxalic acid. The mixture was maintained at 65° C. and the product formed was a hard surfaced, white resin.

*Example XI*

28 parts of 3,4-dihydro-1,2-pyran-2-carboxaldehyde were heated with 12 parts of glycerol n-decyl ether and 6 parts of glycerol in the presence of oxalic acid. The resulting product was a soft, resinous product.

*Example XII*

24 parts of 3,4-dihydro-1,2-pyran-2-carboxaldehyde were heated with 35 parts of linseed monoglyceride in the presence of .2 part oxalic acid at about 80° C. The resulting product was a very viscous liquid showing excellent air drying properties.

*Example XIII*

About 4 parts of 3,4-dihydro-1,2-pyran-2-carboxaldehyde were heated with 36 parts of linseed diglyceride in the presence of .2 part of oxalic acid at about 80° C. The resulting product was a very viscous liquid showing excellent air drying properties. The film formed after drying and baking of the said product possessed improved resistance to organic solvents.

*Example XIV*

12 parts of 3,4-dihydro-1,2-pyran-2-carboxaldehyde were heated with 24 parts of linseed diglyceride and 17 parts of linseed monoglyceride in the presence of .2 part of oxalic acid at 90° C. The resulting product was a viscous liquid which gave a good film on air drying and baking.

*Example XV*

About 10 parts of 2,5-dichloro-3,4-dihydro-1,2-pyran-2-carboxaldehyde are heated with 8 parts of glycerol in the presence of oxalic acid. The resulting product is a soft, resinous product.

*Example XVI*

About 45 parts of 2-butyl-3,4-dihydro-1,2-pyran-2-carboxaldehyde are heated with 25 parts of glycerol n-decyl ether stearate in the presence of oxalic acid. The resulting product is a soft, resinous material.

We claim as our invention:

1. The resinous reaction product obtained by a process consisting of heating 3,4-dihydro-1,2-pyran-2-carboxaldehyde with glycerol in the equivalent ratio of 1:2 to 2:1 in the presence of oxalic acid at a temperature between about 65° C. and about 80° C. until a resinous product has been obtained and subsequently recovering the resinous product.

2. The resinous reaction product obtained by a process consisting of heating 3,4-dihydro-1,2-pyran-2-carboxaldehyde with linseed diglyceride in the equivalent ratio of 1:2 to 2:1 in the presence of oxalic acid at a temperature between about 65° C. and about 80° C. until a resinous product has been obtained and subsequently recovering the resinous product.

3. The resinous reaction product obtained by a process consisting of heating 2,5-dimethyl-3,4-dihydro-1,2-pyran-2-carboxaldehyde with glycerol in the equivalent ratio of 1:2 to 2:1 in the presence of oxalic acid at a temperature between about 65° C. and about 80° C. until a resinous product has been obtained and subsequently recovering the resinous product.

4. The resinous reaction product obtained by a process consisting of heating 3,4-dihydro-1,2-pyran-2-carboxaldehyde with resorcinol in the equivalent ratio of 1:5 to 5:1 in the presence of oxalic acid at a temperature between about 65° C. and about 80° C. until a resinous product has been obtained and subsequently recovering the resinous product.

5. A process consisting of heating 3,4-dihydro-1,2-pyran-2-carboxaldehyde with glycerol in the equivalent ratio of 1:5 to 5:1 in the presence of oxalic acid at a temperature between about 65° C. and about 80° C. until a resinous product has been obtained and subsequently recovering the resinous product.

6. A process consisting of heating 3,4-dihydro-1,2-pyran-2-carboxaldehyde with linseed diglyceride in the equivalent ratio of 1:5 to 5:1 in the presence of oxalic acid at a temperature between about 65° C. and about 80° C. until a resinous product has been obtained and subsequently recovering the resinous product.

7. The resinous reaction product obtained by a process consisting of heating 3,4-dihydro-1,2-pyran-2-carboxaldehyde with a monoester of glycerol and a hydrocarbon monocarboxylic acid derived from a drying oil containing no other groups reactive with the carboxaldehyde group than the hydroxyl group in an equivalent ratio of 1:5 to 5:1 in the presence of a moderately strong acid catalyst at a temperature between 65° C. and 100° C. until a resinous product has been obtained and subsequently recovering the resinous product.

8. The resinous reaction product obtained by a process consisting of heating 3,4-dihydro-1,2-pyran-2-carboxaldehyde with a diester of glycerol and a hydrocarbon monocarboxylic acid derived from a drying oil containing no other groups reactive with the carboxaldehyde group than the hydroxyl group in an equivalent ratio of 1:5 to 5:1 in the presence of a moderately strong acid catalyst at a temperature between 65° C. and 100° C. until a resinous product has been obtained and subsequently recovering the resinous product.

9. The resinous reaction product obtained by a process consisting of heating 3,4-dihydro-1,2-pyran-2-carboxaldehyde with a polyhydroxy-substituted aliphatic hydrocarbon containing no other groups reactive with the carboxaldehyde group than the hydroxyl group in the equivalent ratio of 1:5 to 5:1 in the presence of an acid catalyst until a resinous product is obtained and subsequently recovering the said product.

10. A process consisting of heating a dihydropyran carboxaldehyde of the formula

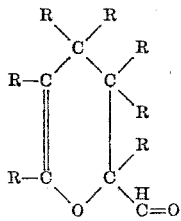

wherein R is a member of the group consisting of hydrogen, halogen and alkyl radicals containing from 1 to 5 carbon atoms, with an organic hydroxy-containing compound of the group consisting of polyhydroxy-substituted aliphatic hydrocarbons, polyhydroxy-substituted aromatic hydrocarbons, hydrocarbon partial ethers of polytial esters of polyhydroxy-substituted aliphatic hydrocarbons, hydrocarbon carboxylic acid partial esters of polyhydroxy-substituted aromatic hydrocarbons, hydocarbon partial ethers of polyhydroxy-substituted aliphatic hydrocarbons and hydrocarbon carboxylic acid partial esters of the aforementioned partial ethers, hydrocarbon partial ethers of polyhydroxy-substituted aromatic hydrocarbons and hydrocarbon carboxylic acid partial esters of the latter described partial ethers, in an equivalent ratio of 1:5 to 5:1 in the presence of an acid catalyst until a resinous product is obtained and subsequently recovering the resinous product.

11. A resinous reaction product obtained by a process consisting of heating a dihydropyran carboxaldehyde of the formula

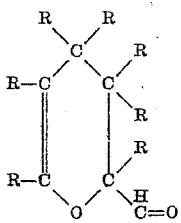

wherein R is a member of the group consisting of hydrogen, halogen and alkyl radicals containing from 1 to 5 carbon atoms, with an organic hydroxy-containing compound of the group consisting of polyhdroxy-substituted aliphatic hydrocarbons, polyhydroxy-substituted aromatic hydrocarbons, hydrocarbon carboxylic acid partial esters of polyhydroxy-substituted aliphatic hydrocarbons, hydrocarbon carboxylic acid partial esters of polyhydroxy-substituted aromatic hydrocarbons, hydrocarbon partial ethers of polyhydroxy-substituted aliphatic hydrocarbons and hydrocarbon carboxylic acid partial esters of the aforementioned partial ethers, hydrocarbon partial ethers of polyhydroxy-substituted aromatic hydrocarbons and hydrocarbon carboxylic acid partial esters of the latter described partial ethers, in an equivalent ratio of 1:5 to 5:1 in the presence of an acid catalyst until a resinous product is obtained and subsequently recovering the resinous product.

12. The process as defined in claim 10 wherein the temperature is between 65° C. and 100° C.

13. The process as defined in claim 10 wherein the catalyst is a moderately strong acid catalyst.

14. A process consisting of heating a dihydropyran carboxaldehyde of the formula

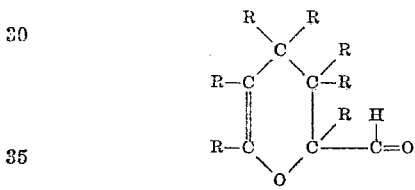

wherein R is a member of the group consisting of hydrogen, halogen and alkyl radicals containing from 1 to 5 carbon atoms with a polyhydroxy-substituted aliphatic hydrocarbon in an equivalent ratio of 1:2 to 2:1 in the presence of an acid catalyst until a resinous product is obtained and subsequently recovering the resinous product.

15. A process as in claim 14 wherein the polyhydroxy-substituted aliphatic hydrocarbon is glycerol.

16. The process as in claim 14 wherein the reaction is conducted at a temperature between 65° C. and 100° C.

RICHARD R. WHETSTONE.
SEAVER A. BALLARD.

References Cited in the file of this patent

UNITED STATES PATENTS

| Number | Name | Date |
|---|---|---|
| 2,479,283 | Whetstone | Aug. 16, 1949 |
| 2,514,688 | Whetstone | July 11, 1950 |
| 2,574,444 | Whetstone | Nov. 6, 1951 |

OTHER REFERENCES

Huntress Problems in Organic Chemistry, page 71, 1938, McGraw-Hill, New York.

Cherline Journ. Gen. Chem. (U. S. S. R.) vol. 8, pages 22–34 (1938).

Delepine Annales de Chimie et de Physique, 8th series, vol. 20, pages 389–417 (1910).

Alder Berichte der Deutschen Chemischen Gesellschaft vol. 74, pages 905–929 (1941).